United States Patent [19]

Kijima

[11] Patent Number: 6,081,439
[45] Date of Patent: *Jun. 27, 2000

[54] INVERTER PROVIDED WITH OUTPUT REGULATING MECHANISM

[75] Inventor: Seiichi Kijima, Tokyo-to, Japan

[73] Assignee: Kijima Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/864,054

[22] Filed: May 27, 1997

[30] Foreign Application Priority Data

Jun. 19, 1996 [JP] Japan .................................... 8-177246
Oct. 30, 1996 [JP] Japan .................................... 8-303468

[51] Int. Cl.⁷ .................................................. H02M 7/538
[52] U.S. Cl. .............................. 363/97; 363/26; 315/219; 315/DIG. 5
[58] Field of Search .................................. 363/24, 25, 26, 363/470, 89; 315/DIG. 5, DIG. 7, 219

[56] References Cited

U.S. PATENT DOCUMENTS 4,920,302  4/1990  Konopka ............................ 315/DIG. 7

*Primary Examiner*—Jeffrey Sterrett
*Attorney, Agent, or Firm*—Hogan & Hartson LLP

[57] ABSTRACT

The invention relates to an inverter including an output regulating mechanism which is simplified in its construction and suitable for reduction of the manufacturing cost. The output regulating mechanism comprises a volume control adapted to be applied with an input voltage for said booster transformer periodically changing as the inverter oscillates, control means adapted to pulse-convert the output signal of the volume control and thereby to output a control signal which has been pulse width modulated according to the output signal of the volume control, and switching means provided on an input current path for the booster transformer so as to be turned ON and OFF with the control signal provided from the control means.

11 Claims, 8 Drawing Sheets

INVERTER PROVIDED WITH OUTPUT REGULATING MECHANISM

BACKGROUND OF THE INVENTION

1. Technical Field

This invention relates to an inverter used, for example, as a driver for fluorescent lamp or EL-board as well as for ionizer or ozonizer and more particularly to an inverter provided with output regulating mechanism suitable for cost reduction.

2. Background Art

FIG. 8 of the accompanying drawings is a circuit diagram illustrating a conventional embodiment of the inverter constructed as the driver for a fluorescent lamp, in which a booster transformer 11 includes an input coil 11P having a center tap P, an output coil 11S and a feedback coil 11f.

A capacitor 12 for resonance is connected in parallel to the input coil 11P and an AC voltage is output from the output coil 11S.

Transistors 13, 14 are switching transistors adapted to be repeatedly turned ON and OFF so that the transistor 13 serves to interrupt the current flowing through a section of the input coil 11P on one side with respect to the center tap P and the transistor 14 serves to interrupt the current flowing through a section of the input coil 11P on the other side with respect to said center tap P.

These transistors 13, 14 are alternately turned ON with the starting current applied to their bases from a source battery 15 through a starting rheostat 16 and operation of these transistors 13, 14 is accelerated under a feedback effect provided by a feedback coil 11f connected to the bases of the respective transistors 13, 14.

The center tap P of said booster transformer 11 is supplied with the source current through the switching transistor 17 and a choke coil 18. During this current supply, said switching transistor 17 is turned ON and OFF in response to the pulse signal applied to its base from a luminance regulating IC 19.

Reference numeral 20 designates a diode serving to absorb a counter electromotive force of the choke coil 18.

The luminance regulating IC 19 regulates an output voltage level of the booster transformer 11 and thereby changes the luminance of the fluorescent lamp 21. To this end, the luminance regulating IC 19 outputs a pulse signal of a duty ratio depending on a set point for a regulating resistor 22 so that said pulse signal makes the switching transistor 17 conductive.

Reference numeral 23 designates a starter switch.

The output coil 11S of the booster transformer 11 is connected through a capacitor 24 to the fluorescent lamp 21.

A resistor 25, a diode 26 and a capacitor 27 form together a detector circuit for a load current and a voltage charged in the capacitor 27 is applied as a detection signal to the luminance regulating IC 19 through the regulating resistor 22.

With this converter of prior art as has been described above, upon closure of the starter switch 23, the luminance regulating IC 19 outputs the pulse signal of a duty ratio depending on the set point for the regulating resistor 22 and the switching transistor 17 responds to this pulse signal to be repeatedly turned ON and OFF.

Such operation of the switching transistor 17 causes the source current to be applied through this transistor 17 and the choke coil 18 to the center tap P of the booster transformer 11.

Thereupon a starting current is applied through the starting rheostat 16 to the bases of the respective transistors 13, 14 which are then switched from OFF-state to ON-state. It should be understood here that these two transistors 13, 14 are different from each other in transistor characteristic and circuit arrangement so that one of them becomes more positively conductive than the other and said one transistor is turned ON earlier than the other.

For example, assumed that the transistor 13 is turned ON earlier than the transistor 14, the source current will be supplied through the input coil 11P on one side with respect to the center tap P and the transistor 13.

When the input current flows through the input coil 11P, the inductive voltage generated across the feedback coil 11f is applied to the base of the transistor 13. This feedback effect accelerates the transistor 13 to be turned ON.

Transistor 13 is switched from ON to OFF at a time point depending on a magnetic saturation characteristic of the booster transformer 11 as well as on the transistor characteristics of said transistor 13 and then the transistor 14 is turned ON.

Now the source current is supplied through the input coil 11P on the other side with respect to the center tap P and the transistor 14, whereupon the inductive voltage generated across the feedback coil 11f is applied to the base of the transistor 14 to achieve the feedback effect.

Similarly to the case of the transistor 13, the transistor 14 is switched from ON to OFF at the time point depending on the magnetic saturation characteristic of the booster transformer 11 as well as on the transistor characteristics of said transistor 14 and then the transistor 13 is turned ON.

Alternate turning ON of the transistors 13, 14 in this manner causes the inverter to oscillate and thereby to generate high AC voltage across the output coil 11S.

The fluorescent lamp 21 is turned ON by the AC voltage output from the output coil 11S and the tube current (i.e., load current) is detected by a detector circuit comprising a resistor 25, a diode 26 and a capacitor 27.

Fluctuation in the tube current is thus detected and the detection signal is applied to the luminance regulating IC 19.

With the inverter of prior art as has been described above, the switching transistor 17 responds to the pulse signal output from the luminance regulating IC to be turned ON and OFF, so an amount of current applied to the input coil 11P of the booster transformer 11 depends on this pulse signal.

In other word, a level of AC voltage output from the booster transformer 11 depends on a duty ratio of said pulse signal.

Therefore, the duty ratio of the pulse signal output from the luminance regulating IC 19 may be adjusted in order to adjust a luminance of electric light provided by the fluorescent lamp 21 when the latter is turned ON.

However, the luminance regulating IC 19 employed by the above-mentioned inverter of prior art as means to regulate the luminance of electric light provided by the fluorescent lamp 21 inevitably complicates the circuit arrangement and increases the component cost.

SUMMARY OF THE INVENTION

In view of the situation as has been described above, it is a principal object of the invention to provide an inverter including an output regulating mechanism of a construction simplified to reduce a manufacturing cost.

The object set forth above is achieved, according to a first aspect of the invention, by an inverter including a booster transformer adapted to output a voltage through oscillation of said inverter so that an output of said inverter is regulated by changing an output voltage level of said booster transformer, said inverter comprising an output regulating mechanism consisting of a volume or amplitude control adapted to be applied with an input voltage for said booster transformer periodically changing as the inverter oscillates and switching means provided on an input current path for said booster transformer so as to be turned ON and OFF with an output signal provided from said volume control.

With the arrangement as has been described just above, the input voltage for the booster transformer assumes the form of a repeated waveform voltage (i.e., sinusoidal full-wave rectified voltage) periodically changing as the inverter oscillates and the output signal of the volume control through which the booster transformer is applied with its input voltage assumes the form of a voltage signal having a waveform depending on said input voltage as well as on a set point at which said volume control should operate.

The switching means provided on the input current path for the booster transformer is controlled by the repeated output signal provided from the volume control so as to be turned ON and OFF every time said output signal reaches a predetermined value of voltage at which said switching means should be turned ON and OFF.

With the inverter constructed in this manner, the volume control may be adjusted to change the output signal level thereof and thereby to regulate the output of the inverter.

It is also possible to regulate the output of the inverter by changing said predetermined value of voltage to be compared with the output signal of the volume control instead of changing this output signal.

The object set forth above is also achieved, according to a second aspect of the invention, by an inverter including a booster transformer adapted to output a voltage through oscillation of the inverter so that an output of the inverter is regulated by changing an output voltage level of said booster transformer, said inverter comprising an output regulating mechanism consisting of a volume control adapted to be applied with an input voltage for said booster transformer periodically changing as the inverter oscillates, control means adapted to pulse-convert the output signal provided from the volume control and thereby to output a control signal which has been pulse width modulated according to said output signal, and switching means provided on an input current path for said booster transformer so as to be turned ON and OFF with said control signal.

DESCRIPTION OF THE PREFERRED EMBODIMENTS

Details of the invention will be more fully understood from the following description of preferred embodiments given hereunder in reference with the accompanying drawings.

Figure 1:
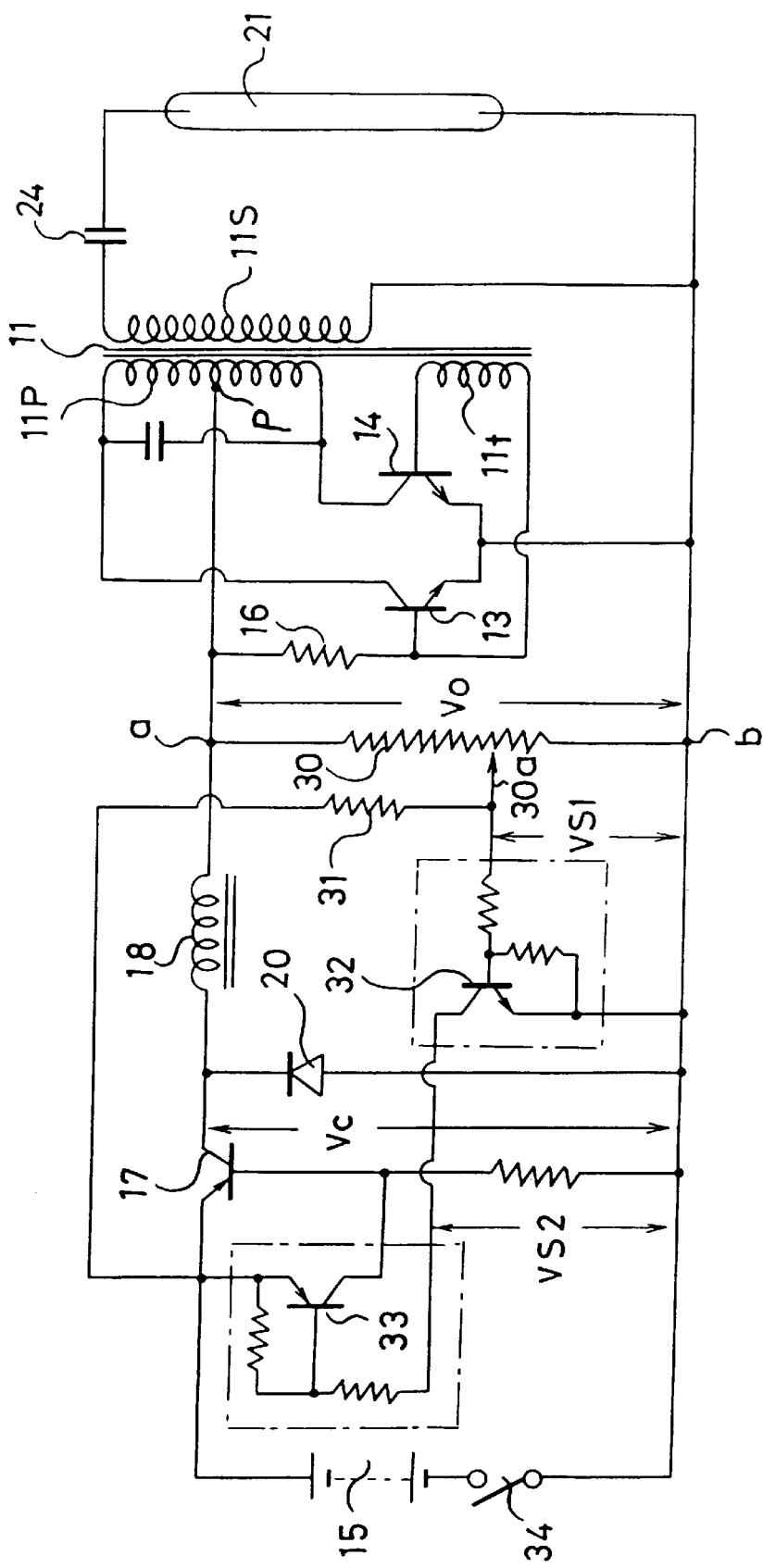
FIG. 1 is a circuit diagram illustrating a first embodiment of the inverter according to the invention.

FIG. 1 is a circuit diagram of an inverter particularly implemented as a first embodiment of the invention in the form of a driver for fluorescent lamp.

Figure 8:
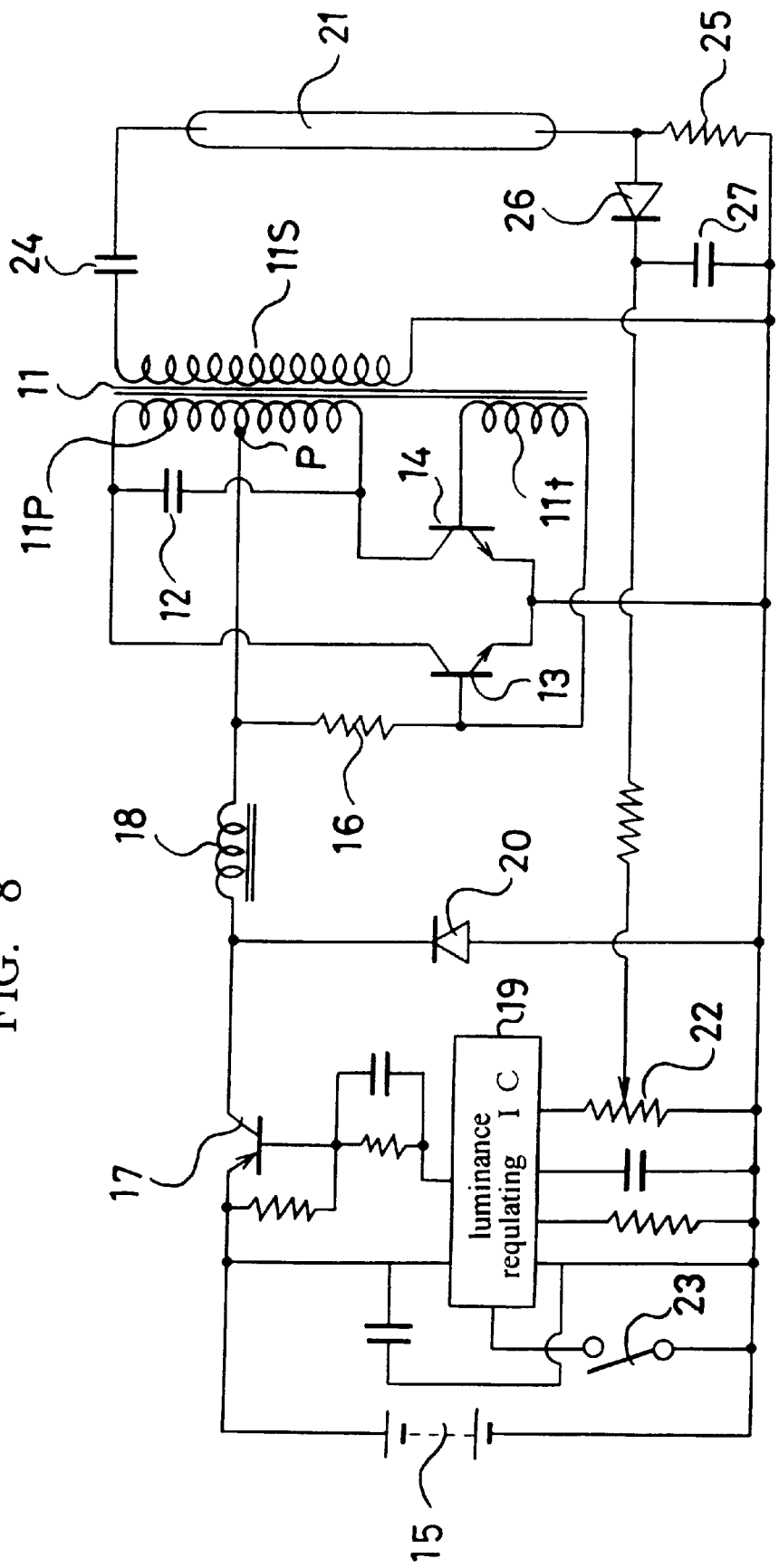
FIG. 8 is a circuit diagram exemplarily illustrating an inverter of prior art.

It should be understood that the circuit sections as well as the components similar to those in the well known arrangement illustrated by FIG. 8 are designated by the similar reference numerals, respectively, and will be no more described again in detail.

In this embodiment, there is provided a volume or amplitude control (i.e., a variable resistor) 30 connected between an input current path a extending from a choke coil 18 to a center tap P of a booster transformer 11 and a current path b connected to the negative side of a source battery 15 so that said volume control 30 is applied with an input voltage Vo for the booster transformer 11.

An output voltage VS1 provided from an output terminal 30a of the volume control 30 is applied to the base of a transistor 32 for switching control.

Specifically, the transistor 32 is turned ON and outputs a control signal VS2 when said output voltage VS1 exceeds a switching voltage (i.e., a base-emitter voltage Vbe of said transistor 32).

It should be understood that a resistor 31 connected between the output terminal 30a and the source battery 15 serves to stabilize an output voltage of the booster transformer 11 against a fluctuation of the source voltage.

The control signal VS2 is applied to the base of another transistor 33 for switching control.

This transistor 33 has its collector connected to the base and its emitter connected to the emitter of the switching transistor 17 so that the control signal VS2 applied to the base of this transistor 33 causes said transistor 33 to be turned ON and thereby to short-circuit the emitter-base of said switching transistor 17.

In this manner, the switching transistor 17 is turned ON as the transistor 33 is turned ON and turned OFF as the transistor 33 is turned OFF.

The inverter as has been described hereinabove is initiated to oscillate as a source switch 34 is closed.

More specifically, upon closure of the source switch 34, starting current is applied to the bases of the respective transistors 13, 14 and, in consequence, these transistors 13, 14 are alternately turned ON in repetition.

Thus, input current flows alternately through a coil section on one side and through another coil section on the other side with respect to the center tap P provided on the input coil 11P of the booster transformer 11.

High AC voltage generated across the output coil 11S in this manner is applied to a fluorescent lamp 21 which is thereby driven to initiate its lighting.

Figure 2A:
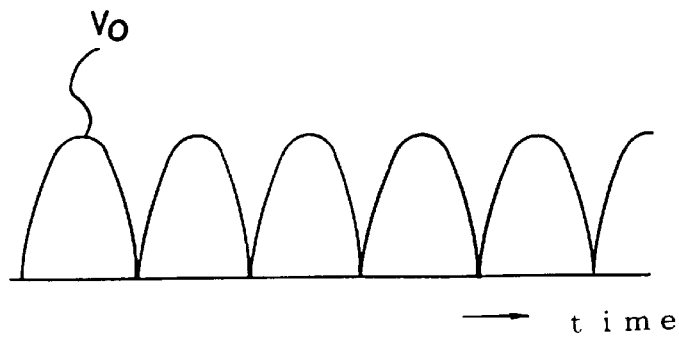
FIG. 2 is a diagram schematically illustrating waveforms of voltage generated across respective circuit sections of said inverter.

During such oscillation of the inverter, the voltage Vo applied to the volume control 30 describes continuously repeated sinusoidal half-waves as shown by FIG. 2(A).

Figure 2B:
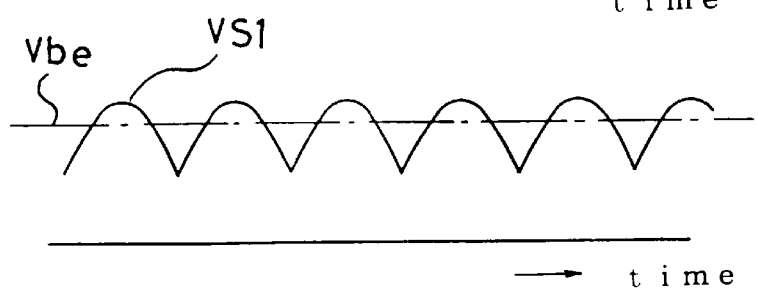

Correspondingly, the output signal VS1 of the volume control 30 assumes the form of a repeatedly pulsating signal as shown by FIG. 2(B) of a voltage level according to a set point at which the output terminal 30a should operates.

Figure 2C:
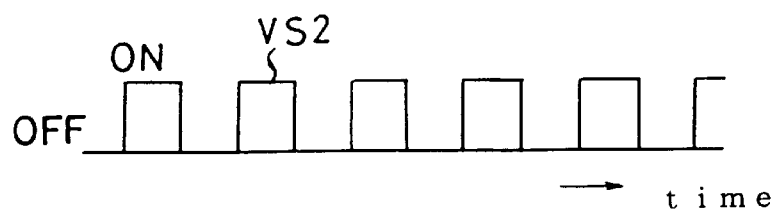

The control signal VS2 output from the transistor 32 turned ON assumes the form of a pulse signal as shown by FIG. 2(C) because the transistor 32 is turned ON as said output signal VS1 exceeds the base-emitter voltage Vbe of this transistor 32.

In this way, the transistor 32 functions as a pulse width modulator.

Figure 2D:
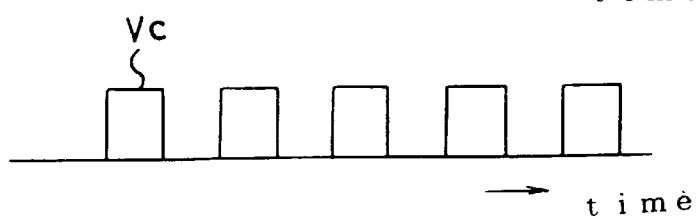

The other transistor 33 is repeatedly turned ON and thereby controls the switching transistor 17 to be turned OFF as the control signals VS2 are applied to the base of said transistor 33. In this manner, the transistor 17 is alternately turned ON and OFF in repetition and collector voltage Vc of this transistor 17 describes a waveform as illustrated by FIG. 2(D).

As will be understood from the foregoing description, the inverter according to the first embodiment is so arranged that turning ON and OFF of the switching transistor 17 is controlled by the control signal VS2 which depends on the set point for the volume control 30 and thereby the input current of the booster transformer 11 is limited.

More specifically, the input current of the booster transformer 11 may be adjusted by selecting a desired set point at which the volume control 30 should operate and thereby the output voltage level of said transformer 11 may be correspondingly varied to regulate a luminance of electric light emitted from the fluorescent lamp 21.

Figure 3:
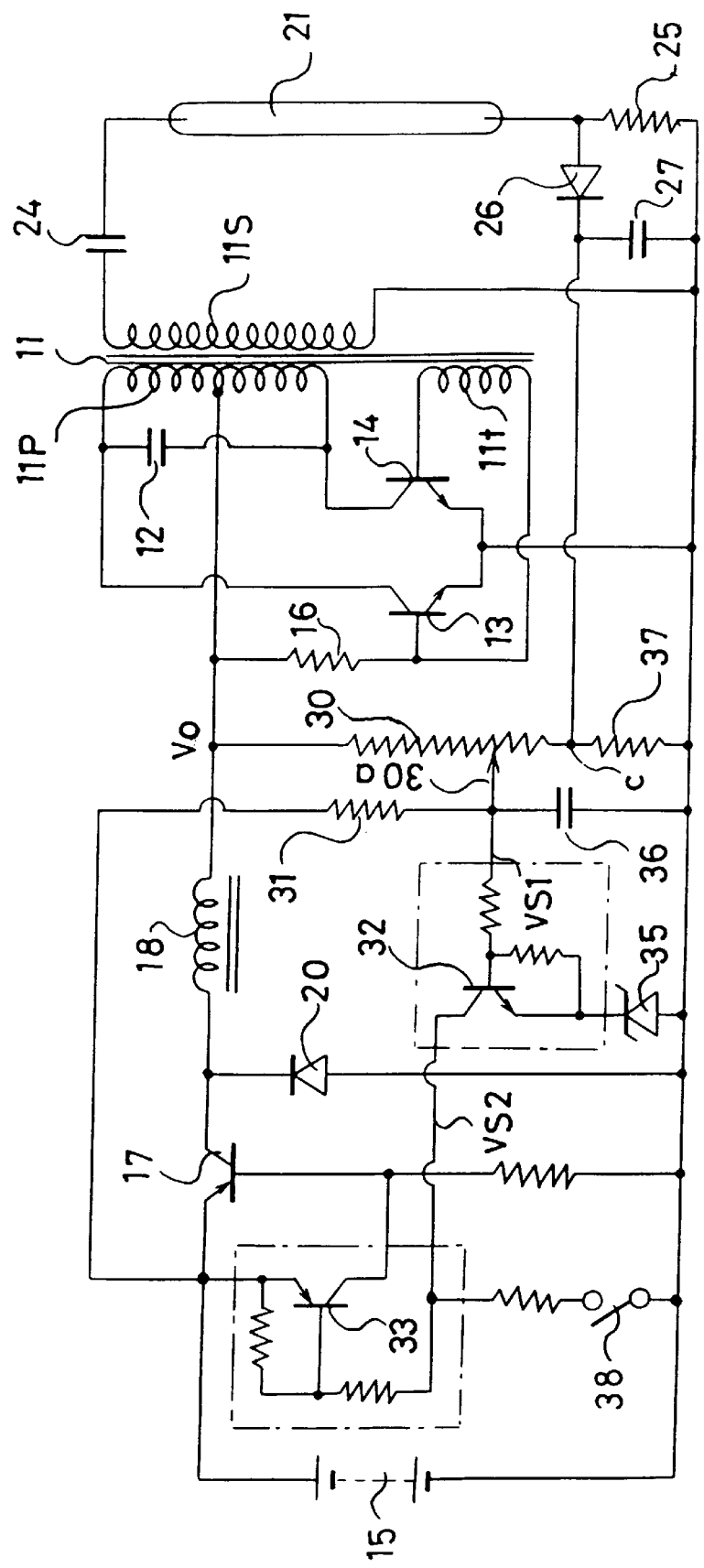
FIG. 3 is a circuit diagram illustrating a second embodiment of the inverter according to the invention.

FIG. 3 is a circuit diagram illustrating a second embodiment of the inverter according to the invention.

This specific embodiment of the inverter includes a Zener diode 35 connected to the emitter of the transistor 32 as control means serving to alleviate an influence of the ambient temperature.

In addition to the resistor 31 serving to prevent the output of the booster transformer 11 from being affected by fluctuation in the source voltage, a capacitor 36 is connected to the output terminal 30a to maintain further stabilized output voltage.

When the load current detector circuit comprising the resistor 25, the diode 26 and the capacitor 27 is adopted also in this embodiment, a detecting resistor 37 is connected in series with the volume control 30 so that a detection signal of said detector circuit may be applied to a node at which said detecting resistor 37 is serially connected to said volume control 30.

With such arrangement, an increased load current results in a correspondingly higher level of the detection signal and, in consequence, a level of the output signal VS1 becomes higher so as to enlarge a duty ratio of the control signal VS2.

As a result, the turned-ON duration of the transistor 33 is prolonged and the turned-ON duration of the switching transistor 17 is correspondingly shortened, so the input current decreases and the output current increases.

Decrease in the load current, on the other hand, causes the components to operate vice versa.

More specifically, the duty ratio of the control signal VS2 is reduced so as to shorten the turned-ON duration of the transistor 33 and to prolong the turned-ON duration of the switching transistor 17.

Consequently, the input current and, therefore, the output current of the booster transformer 11 increase.

It should be understood that this second embodiment further comprises a starter switch 38 provided between the collector of the transistor 32 and the line on the negative side of the source battery 15.

So long as this starter switch 38 remains closed, the transistor 33 is maintained in its turned-ON state and the switching transistor 17 is maintained in its turned-OFF state. When this starter switch 38 is opened, the oscillation is initiated in the manner as has been described above.

As will be apparent from the foregoing description, the output regulating mechanism adopted by the invention can be constructed by a few components, i.e., the single volume control 30 and the pair of transistors 31, 32, thus allowing the number of circuit components and, therefore, the manufacturing cost of the inverter as a whole to be effectively reduced.

Figure 4:
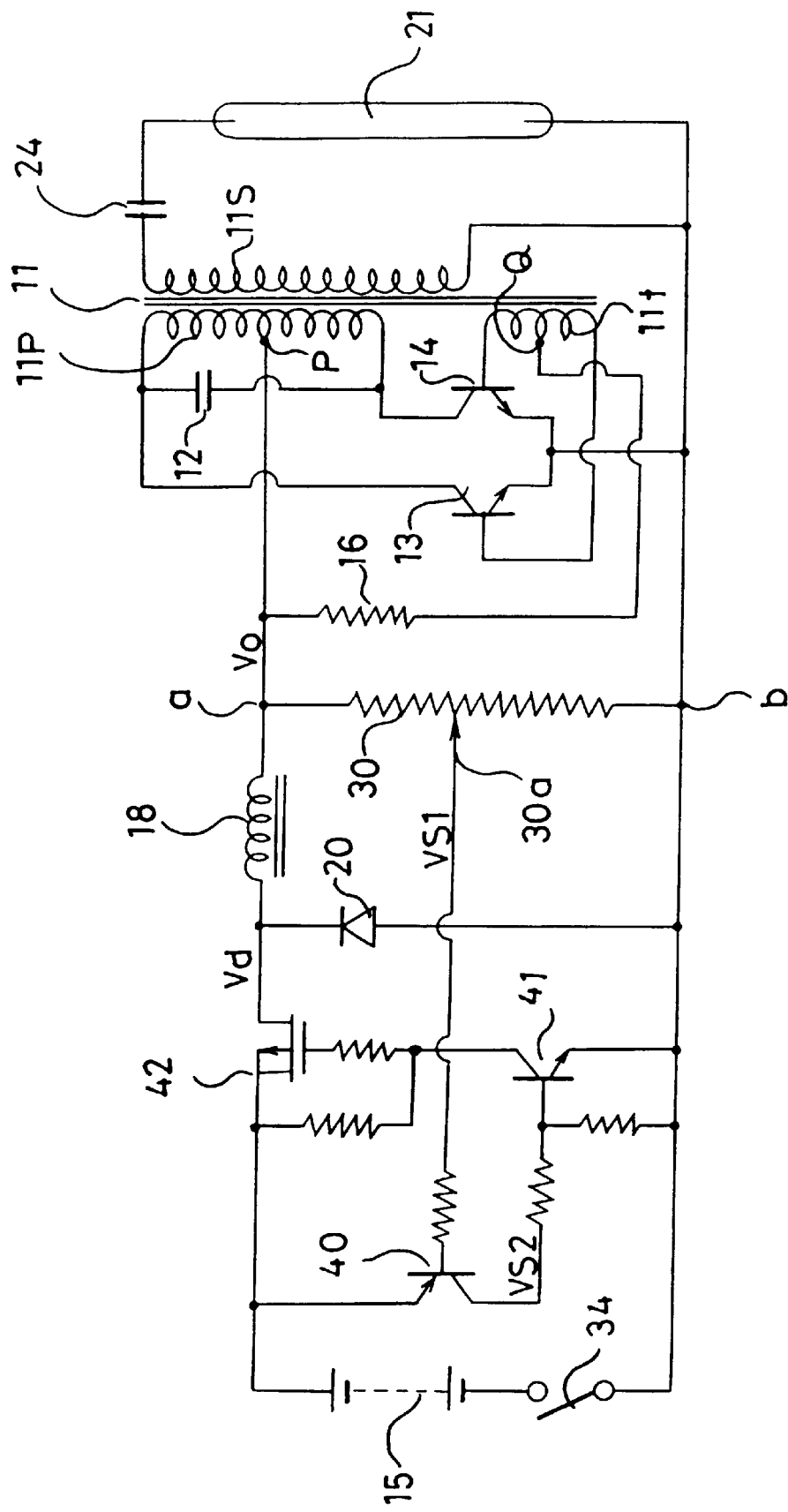
FIG. 4 is a circuit diagram illustrating a third embodiment of the inverter according to the invention.

FIG. 4 is a circuit diagram illustrating a third embodiment of the inverter also in the form of the driver for the fluorescent lamp.

It should be understood that the circuit sections as well as the components similar to those in the well known arrangement illustrated by FIG. 8 are designated by the similar reference numerals and will be no more described again in detail.

In this embodiment also, there is provided the volume control (i.e., the variable resistor) 30 connected between the input current path a extending from the choke coil 18 to the center tap P of the booster transformer 11 and the current path b connected to the negative side of the source battery 15 so that said volume control is applied with the input voltage Vo for the booster transformer 11.

The output signal VS1 provided from the output terminal 30a of the volume control 30 is applied to the base of a transistor 40 serving for switching control.

Specifically, the transistor 40 is turned ON and outputs the control signal VS2 when said output signal exceeds a switching voltage (i.e., a base-emitter voltage Vbe of said transistor 40). This transistor 40 functions as a pulse width modulator.

The control signal VS2 is applied to the base of another transistor 41.

This transistor 41 has its collector connected to the gate of a FET 42 and its emitter connected to a line on the negative side of the source so that said transistor 41 is turned ON in response to the control signal VS2 applied to its base and lowers a gate potential of the FET 42.

In this way, the FET 42 becomes conductive as the transistor 41 is turned ON and becomes nonconductive as the transistor 41 is turned OFF.

It should be understood that the FET 42 comprises a P-channel MOS transistor having its source connected to the positive side of the source battery 15 and its drain connected to the choke coil 18.

The inverter as has been described herein is initiated to oscillate as the source switch 34 is closed.

More specifically, upon closure of the source switch 34, the starting current flows through the base-emitter of the transistor 40, the output terminal 30a and the volume control 30 whereupon this transistor 40 is thereby turned ON.

As a result, the transistor 41 and, therefore, the FET 42 are turned ON.

With the FET 42 being turned ON, the starting current is applied to the bases of the respective transistors 13, 14 and, in consequence, these transistors 13, 14 are alternately turned ON in repetition as in the case of the previously described arrangement of prior art.

In this specific embodiment, the feedback coil 11f of the booster transformer 11 is provided with a center tap Q so that the starting current is applied through said center tap Q and said feedback coil 11f to the bases of the respective transistors 13, 14.

With such arrangement, the input current flows alternately through the coil section on one side and through the other coil section on the other side with respect to the center tap P provided on the input coil 11P of the booster transformer 11.

In this manner, the high AC voltage generated across the output coil 11S is applied to the fluorescent lamp 21 which is thereby driven to initiate its lighting.

Figure 5A:
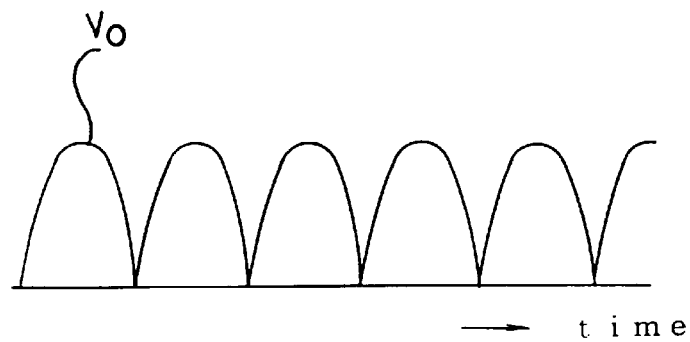
FIG. 5 is a diagram schematically illustrating waveforms of voltage generated across respective circuit sections of the inverter according to the third embodiment.

During such oscillation of the inverter, the voltage Vo applied to the volume control 30 describes continuously repeated sinusoidal half-waves as illustrated by FIG. 5(A).

Figure 5B:
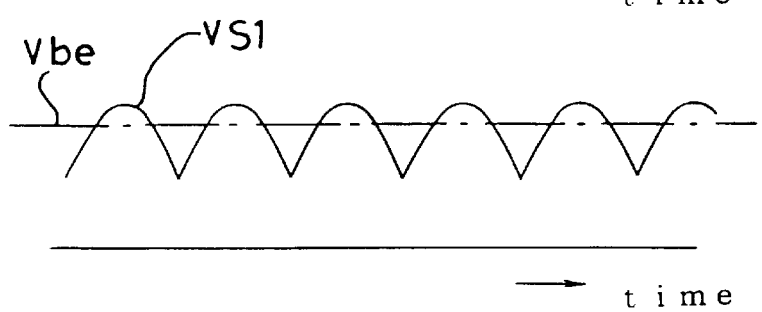

Correspondingly, the output signal VS1 of the volume control 30 assumes the form of a repeated pulsating signal as illustrated by FIG. 5(B) of a voltage level depending on the set point at which the output terminal 30a should operate.

Figure 5C:
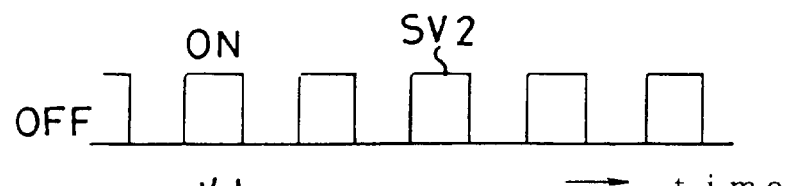

Since the transistor 40 remains in turned-ON state unless the output signal VS1 exceeds the base-emitter voltage Vbe and is turned OFF as said output signal exceeds said voltage Vbe, the control signal VS2 output based on such turning ON and OFF assumes the form of a pulse signal as illustrated by FIG. 5(C).

Figure 5D:
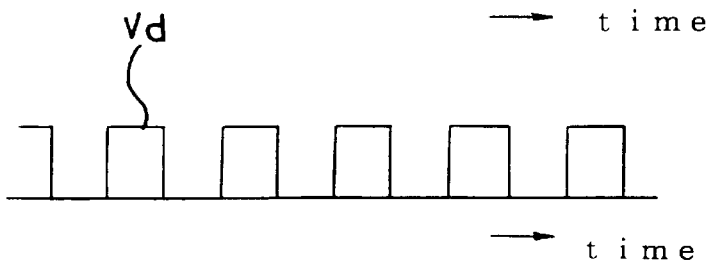

The transistor 41 is repeatedly turned ON and thereby controls the FET 42 to be turned OFF as the control signals VS2 are applied to the base of said transistor 41. In this manner, the FET 42 is alternately turned ON and OFF in repetition and a drain voltage Vd of the FET 42 describes a waveform as illustrated by FIG. 5(D).

As will be understood from the foregoing description, the inverter according to this embodiment is so arranged that turning ON and OFF of the FET 42 is controlled by the control signal VS2 depending on the set point for the volume control 30 and thereby the input current of the booster transformer 11 is limited.

More specifically to say, the input current of the booster transformer 11 may be adjusted by selecting an appropriate set point at which the volume control 30 should operate and thereby the output voltage level of said transformer 11 may be correspondingly changed so as to regulate a luminance of electric light emitted from the fluorescent lamp 21.

While the FET 42 becomes conductive across its source-drain generally when the gate potential is lower than the source potential, an exact source-gate potential difference, i.e., a gate voltage required to make the FET 42 conductive depends on a particular grade of the FET 42 or a particular lot if the grade is same.

Such unevenness of the gate voltage which is difficult for the FET 42 to avoid can be effectively compensated by the inverter according to this embodiment for the reason as will be described below.

The gate voltage of the FET 42 drops to zero volt as the transistor 41 is turned ON when the source of the FET 42 is at the source voltage (for example, 6~9 volts), so that the FET 42 is reliably applied with the source-gate voltage (i.e., the gate voltage) required to make the FET 42 conductive even if operation of the FET 42 is accompanied with a certain unevenness due to said unevenness in the gate voltage.

Figure 6:
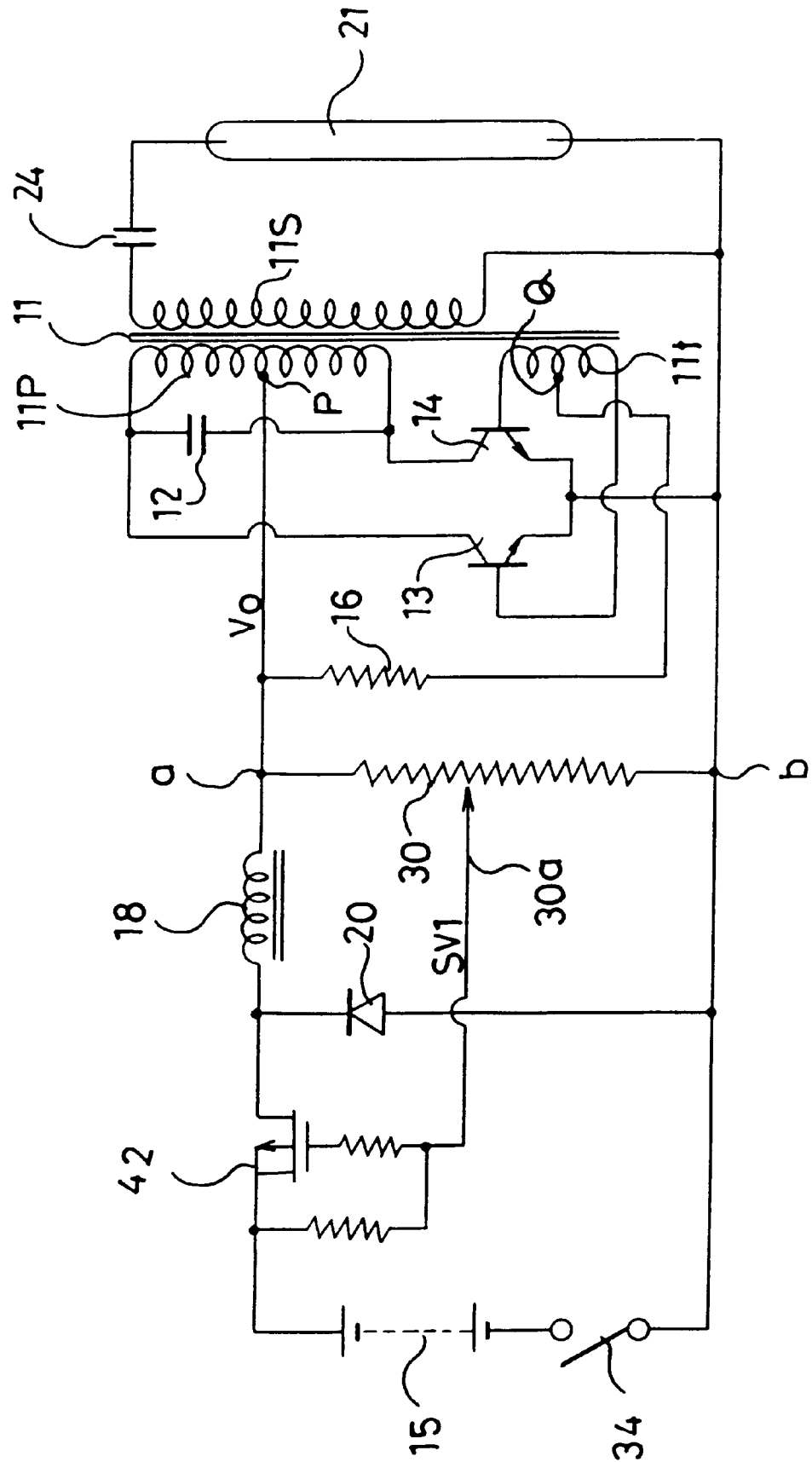
FIG. 6 is a circuit diagram illustrating a fourth embodiment of the inverter according to the invention.

FIG. 6 is a circuit diagram illustrating a fourth embodiment of the inverter according to the invention.

This specific embodiment of the inverter is characterized by an arrangement such that the output signal VS1 provided from the output terminal 30a of the volume control 30 is applied directly to the gate of the FET 42 so as to turn the FET 42 ON.

Figure 7:
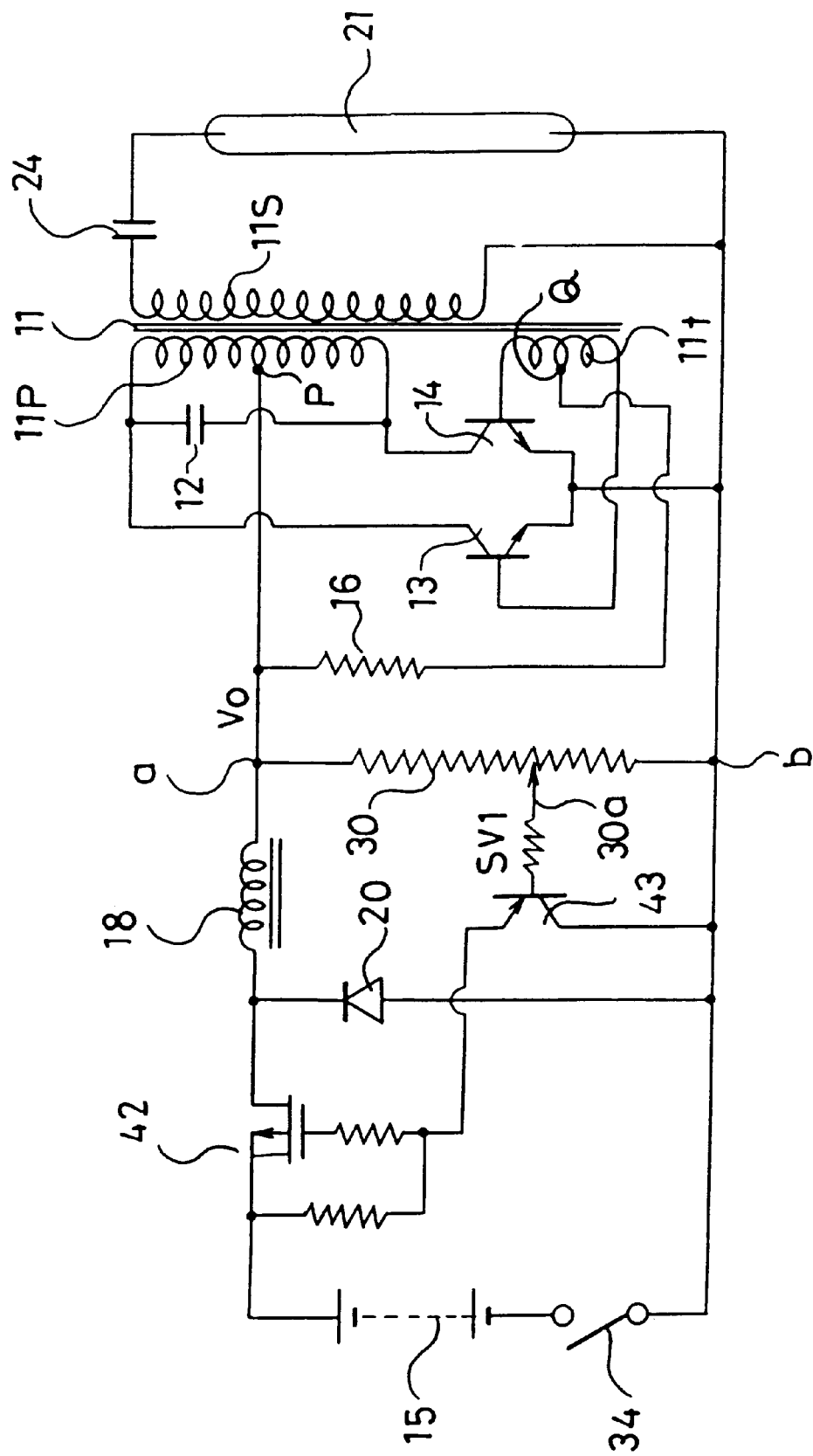
FIG. 7 is a circuit diagram illustrating a fifth embodiment of the inverter according to the invention.

FIG. 7 is a circuit diagram illustrating a fifth embodiment of the inverter according to the invention.

This specific embodiment of the inverter is characterized by an arrangement such that there is provided a transistor 43 adapted to be base-applied with the output signal VS1 of the volume control 30, said transistor 43 remaining in its turned-ON state until said output signal VS1 exceeds a base-emitter voltage Veb of said transistor 43 and being turned OFF as soon as said output signal VS1 exceeds said base-emitter voltage Veb.

These ON-OFF signals of the transistor 43 are applied to the gate of the FET 42 so as to control turning ON-OFF of the FET 42.

While the gate voltage of the FET 42 does not drop to zero voltage according to the circuit arrangement of the inverters as illustrated by FIGS. 6 and 7, the problem possibly caused by this fact can be effectively avoided by employed the FET which is substantially free from the unevenness in the gate voltage required to turn the FET ON.

As has already been described, the output regulating mechanism according to the invention can be constructed by the single volume control 30 alone or the single volume control 30 combined with the transistor. With a consequence, the invention allows the number of parts to be reduced and the construction to be correspondingly simplified for cost reduction of the inverter including the output regulating mechanism.

It should be understood that the power source is not limited to the source battery 15 and any other types of source may be used so far as the source is a DC source.

What is claimed is:

1. An inverter device comprising:
    a booster transformer having an input coil with a center tap and two end points and an output coil;
    a push-pull circuit including first and second switching elements connected respectively to the two end points of the input coil of the booster transformer; and
    an output regulating mechanism comprising an amplitude control applied with a voltage produced at the center tap of the input coil of the booster transformer, and a switching circuit including a third switching element provided on an input current path of the booster transformer, the third switching element being turned ON and OFF in response to an output signal of the amplitude control, thereby changing the voltage of the output coil of the booster transformer.

2. The inverter of claim 1, wherein the amplitude control comprises a variable resistor.

3. The inverter of claim 1, wherein the switching circuit comprises a switching transistor or a FET.

4. A circuit including the inverter of claim 1, further including a fluorescent lamp connected to the output voltage of the booster transformer as a load, wherein a luminance of electric light emitted by the fluorescent lamp is adjusted by adjusting a set point of the amplitude control.

5. The inverter of claim 1, wherein the voltage applied to the amplitude control is a full-wave rectified voltage, and wherein the output regulating mechanism turns the switching circuit ON and OFF based on a set point of the amplitude control and the applied full-wave rectified voltage.

6. The inverter of claim 1, wherein the voltage applied to the amplitude control is a full-wave rectified voltage, wherein the amplitude control outputs a signal based on a set point of the amplitude control and the full-wave rectified voltage, and wherein the output regulating mechanism further includes a control circuit for converting the output signal of the amplitude control to a pulse-width modulated control signal to turn the switching circuit ON and OFF.

7. The inverter of claim 6, wherein the control circuit comprises a transistor circuit as a pulse width modulator and wherein the pulse width of the control signal is dependent on a voltage characteristic of the transistor circuit.

8. An inverter device providing an adjustable output voltage, comprising:

a booster transformer having an input coil and an output coil, the input coil having a center tap and two end points, the output coil providing the output voltage;

a push-pull circuit including a first and a second switching element respectively connected to the two end points of the input coil;

an amplitude control applied with a full-wave rectified voltage produced at the center tap of the input coil of the booster transformer, the amplitude control outputting a signal based on the applied voltage and a set point of the amplitude control;

a control circuit for converting the output signal of the amplitude control to a pulse-width modulated control signal, the control circuit including a transistor circuit as a pulse width modulator, wherein the pulse width of the control signal is dependent on a voltage characteristic of the transistor circuit; and a third switching element provided on an input current path to the center tap of the booster transformer, the third switching element being turned ON and OFF by the pulse-width modulated control signal generated by the control circuit, thereby changing the output voltage of the booster transformer.

9. An inverter device comprising:

a booster transformer having an input coil and an output coil;

a push-pull circuit connected to the input coil of the booster transformer; and an output regulating mechanism comprising an amplitude control applied with an input voltage of the input coil of the booster transformer which changes periodically in response to oscillation in the booster transformer, and a switching circuit including a switching element provided on an input current path of the transformer, the switching element being turned ON and OFF in response to a signal of the amplitude control, thereby changing the voltage of the output coil of the booster transformer.

10. A method in an inverter device including a booster transformer having an input coil with a center tap and an output coil, the method comprising:

applying a voltage produced at the center tap of the input coil of the booster transformer to an amplitude control;

adjusting a set point of the amplitude control to generate an output signal based on the applied voltage and the set point; and turning ON and OFF an input current to the center tap of the booster transformer in response to the output control, thereby changing the voltage at the output coil of the booster transformer.

11. The method of claim 10, wherein the voltage applied to the amplitude control is a sinusoidal full-wave rectified voltage, and wherein the step of turning ON and OFF comprises converting the output signal of the amplitude control to a pulse-width modulated control signal to turn the switching circuit ON and OFF.

* * * * *